US012643678B2

(12) United States Patent
Hill

(10) Patent No.: US 12,643,678 B2
(45) Date of Patent: Jun. 2, 2026

(54) HOIST TOOL FOR ROLLOVER MANAGEMENT OF A STRUCTURE AND ASSOCIATED SYSTEM AND METHOD

(71) Applicant: The Boeing Company, Arlington, VA (US)

(72) Inventor: Chester Hill, Grafton, IL (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/671,880

(22) Filed: May 22, 2024

(65) Prior Publication Data

US 2025/0361027 A1 Nov. 27, 2025

(51) Int. Cl.
 B64F 5/10 (2017.01)
 B64F 5/50 (2017.01)
(52) U.S. Cl.
 CPC . B64F 5/10 (2017.01); B64F 5/50 (2017.01)
(58) Field of Classification Search
 CPC ..................................... B64F 5/10; B64F 5/50
 See application file for complete search history.

(56) References Cited

U.S. PATENT DOCUMENTS 2,702,729 A * 2/1955 Havens ................... F16C 33/76
 384/489
4,440,265 A * 4/1984 Spagnoli ................... B66F 7/04
 182/141

| | | | |
|---|---|---|---|
| 7,481,756 B2 * | 1/2009 | Derscheid | ............... A01F 15/18 |
| | | | 384/537 |
| 9,470,108 B2 * | 10/2016 | Jacobs | ...................... F02K 1/54 |
| 10,260,375 B2 * | 4/2019 | Jacobs | ...................... B64F 5/50 |
| 10,895,171 B2 * | 1/2021 | Jacobs | ...................... B64F 5/50 |
| 11,181,143 B2 * | 11/2021 | Baehr | ...................... F16C 17/26 |
| 11,199,110 B2 * | 12/2021 | Jacobs | ...................... F02K 1/54 |
| 2008/0022864 A1 * | 1/2008 | Derscheid | ............... F16C 13/02 |
| | | | 100/88 |
| 2011/0204006 A1 * | 8/2011 | Jacobs | ...................... F02K 1/54 |
| | | | 211/13.1 |
| 2017/0030225 A1 * | 2/2017 | Jacobs | ...................... B64F 5/50 |
| 2019/0211869 A1 * | 7/2019 | Baehr | ................... F16C 41/005 |
| 2019/0242273 A1 * | 8/2019 | Jacobs | ...................... B64F 5/50 |
| 2021/0317757 A1 * | 10/2021 | Jacobs | ................. F01D 25/285 |

* cited by examiner

*Primary Examiner* — Lawrence Averick
(74) *Attorney, Agent, or Firm* — Kunzler Bean & Adamson

(57) ABSTRACT

Disclosed herein is a hoist tool including a hoist frame and a base structure. The hoist frame includes a structural framework having a first end and a second end and at least one first rotation-enabling coupling at the second end of the structural framework. The base structure includes at least one second rotation-enabling coupling configured to engage with the at least one first rotation-enabling coupling of the hoist frame. The at least one second rotation-enabling coupling of the base structure defines a rolling axis. The hoist frame is selectively movable by the hoist to position the at least one first rotation-enabling coupling into engagement with the at least one second rotation-enabling coupling and when coupled and when the assembled structure is coupled to the hoist frame, the hoist frame is selectively rotatable about the rolling axis, relative to the base structure, to enable a rollover of the assembled structure.

20 Claims, 10 Drawing Sheets

1

HOIST TOOL FOR ROLLOVER MANAGEMENT OF A STRUCTURE AND ASSOCIATED SYSTEM AND METHOD

FIELD

This disclosure relates generally to a hoist tool and, more particularly, to a hoist tool for rollover management of an assembled structure.

BACKGROUND

Large structures (i.e., assembled structures), such as aircraft parts, are commonly assembled within specialized assembly jigs, and later extracted from the assembly jig using a hoist. Often the assembled structure requires orientation adjustment in at least one axis to align the assembled structure into a position for further processing. In some cases, multi-axis orientation adjustment of the assembled structure is required. Conventionally, adjusting the orientation of an assembled structure about multiple axes requires utilizing multiple tools configured for orientation adjustment, which adds to the design complexity, tool cost, and number of steps needed to orient the assembled structure repeatedly about non-compound axes.

SUMMARY

The subject matter of the present application has been developed in response to the present state of the art, and in particular, in response to the problems of and needs created by, or not yet fully solved by, existing hoist tools. Generally, the subject matter of the present application has been developed to provide a hoist tool and associated system and method that overcomes at least some of the above-discussed shortcomings of prior art techniques.

Disclosed herein in a hoist tool that includes a hoist frame and a base structure. The hoist frame includes a structural framework having a first end and a second end, opposite of the first end. The hoist frame also includes at least one first rotation-enabling coupling at the second end of the structure framework. The hoist frame is configured to be supported by a hoist that is configured to be coupled to an assembled structure. The base structure includes at least one second rotation-enabling coupling that is configured to engage with the at least one first rotation-enabling coupling of the hoist frame. The at least one second rotation-enabling coupling of the base structure defines a rolling axis. The hoist frame is selectively movable by the hoist to position the at least one first rotation-enabling coupling of the hoist frame into engagement with the at least one second rotation-enabling coupling of the base structure. When the at least one first rotation-enabling coupling of the hoist frame is engaged with the at least one second rotation-enabling coupling of the base structure, and when the assembled structure is coupled to the hoist frame, the hoist frame is selectively rotatable about the rolling axis, relative to the base structure, to enable a rollover of the assembled structure. The preceding subject matter of this paragraph characterizes example 1 of the present disclosure.

The at least one second rotation-enabling coupling includes at least two second rotation-enabling couplings. A position of the at least two second rotation-enabling couplings is adjustable. An orientation of the rolling axis is adjustable by changing the position of one second rotation-enabling coupling relative to at least another one of the at least two second rotation-enabling couplings. The preceding subject matter of this paragraph characterizes example 2 of the present disclosure, wherein example 2 also includes the subject matter according to example 1, above.

The position of the at least two second rotation-enabling couplings is adjustable in at least one of first directions or second directions, perpendicular to the first directions. The preceding subject matter of this paragraph characterizes example 3 of the present disclosure, wherein example 3 also includes the subject matter according to example 2, above.

The base structure is selectively movable relative to the hoist frame. The preceding subject matter of this paragraph characterizes example 4 of the present disclosure, wherein example 4 also includes the subject matter according to any of examples 1-3, above.

The base structure includes a base-support portion and a rollover-support portion. The base-support portion is configured to interface with a ground surface. The rollover-support portion includes the at least one second rotation-enabling coupling. The preceding subject matter of this paragraph characterizes example 5 of the present disclosure, wherein example 5 also includes the subject matter according to any of examples 1-4, above.

The base-support portion of the base structure includes at least one structure-support surface configured to contact a portion of the assembled structure when the assembled structure is rolled over. The preceding subject matter of this paragraph characterizes example 6 of the present disclosure, wherein example 6 also includes the subject matter according to example 5, above.

The at least one first rotation-enabling coupling is one of an at least one roller element or an at least one roller-receiving element. The at least one second rotation-enabling coupling is the other one of the at least one roller element or the at least one roller-receiving element. The preceding subject matter of this paragraph characterizes example 7 of the present disclosure, wherein example 7 also includes the subject matter according to any of examples 1-6, above.

The at least one roller-receiving element includes a V-shaped receptacle. The at least one roller element is cylindrically shaped and sized to engage with the V-shaped receptable of at least one roller-receiving element, such that the at least one roller element is rotatable within the V-shaped receptacle of the at least one roller-receiving element. The preceding subject matter of this paragraph characterizes example 8 of the present disclosure, wherein example 8 also includes the subject matter according to example 7, above.

The at least one roller-receiving element includes an upper segment and a lower segment. The lower segment defines the V-shaped receptable and the upper segment defines a second V-shaped receptable. The upper segment is pivotable relative to the lower segment to move the at least one roller-receiving element between an open position and a locked position to define a substantially enclosed receptable between the V-shaped receptable and the second V-shaped receptable. The preceding subject matter of this paragraph characterizes example 9 of the present disclosure, wherein example 9 also includes the subject matter according to example 8, above.

The at least one first rotation-enabling coupling includes a plurality of roller elements, each one of the plurality of roller elements spaced-apart from others of the plurality of roller elements. The at least one second rotation-enabling coupling includes a plurality of roller-receiving elements. A position of each one of the plurality of roller-receiving elements corresponding with a position of a corresponding one of the plurality of roller elements. The hoist frame is selectively movable by the hoist to position the plurality of roller elements of the hoist frame within a corresponding one of the plurality of roller-receiving elements. The preceding subject matter of this paragraph characterizes example 10 of the present disclosure, wherein example 10 also includes the subject matter according to any of examples 1-9, above.

The plurality of roller elements includes a first roller element and a second roller element. The plurality of roller-receiving elements includes a first roller-receiving element and a second roller-receiving element. The first roller element is configured to engage with the first roller-receiving element. The second roller element is configured to engage with the second roller-receiving element. The preceding subject matter of this paragraph characterizes example 11 of the present disclosure, wherein example 11 also includes the subject matter according to example 10, above.

Further disclosed herein is a hoist system that includes a hoist, a hoist frame, and a base structure. The hoist frame is supported by the hoist and includes a structural framework including a first end and a second end, opposite of the first end. The hoist frame also includes at least one first rotation-enabling coupling at the second end of the structure framework. The base structure includes at least one second rotation-enabling coupling that is configured to engage with the at least one first rotation-enabling coupling of the hoist frame. The at least one second rotation-enabling coupling of the base structure defines a rolling axis. The hoist frame is selectively movable by the hoist to position the at least one first rotation-enabling coupling of the hoist frame into engagement with the at least one second rotation-enabling coupling of the base structure. When the at least one first rotation-enabling coupling of the hoist frame is engaged with the at least one second rotation-enabling coupling of the base structure, the hoist frame is selectively rotated about the rolling axis, relative to the base structure, by utilizing the hoist to lower the hoist frame to enable a rollover of an assembled structure coupled to the hoist frame. The preceding subject matter of this paragraph characterizes example 12 of the present disclosure.

The hoist is configured to selectively raise or lower the first end of the hoist frame to adjust a position of the assembled structure relative to the base structure. The preceding subject matter of this paragraph characterizes example 13 of the present disclosure, wherein example 13 also includes the subject matter according to example 12, above.

The hoist includes a lifting mechanism configured to exert a lifting force to enable the engagement of the at least one first rotation-enabling coupling with the at least one second rotation-enabling coupling. The preceding subject matter of this paragraph characterizes example 14 of the present disclosure, wherein example 14 also includes the subject matter according to any of examples 12-13, above.

One of the at least one first rotation-enabling coupling or the at least one second rotation-enabling coupling includes at least one roller-receiving element. The at least one roller-receiving element includes an upper segment and a lower segment. The upper segment and the lower segment are pivotable, relative to each other, to move the at least one roller-receiving element between an open position and a locked position to define a substantially enclosed receptacle between the upper segment and the lower segment. The preceding subject matter of this paragraph characterizes example 15 of the present disclosure, wherein example 15 also includes the subject matter according to any of examples 12-14, above.

The assembled structure is an assembled aircraft structure and the hoist frame is configured to be coupled to the assembled aircraft structure. The preceding subject matter of this paragraph characterizes example 16 of the present disclosure, wherein example 16 also includes the subject matter according to any of examples 12-15, above.

Further disclosed herein is a method of enabling rollover of an assembled structure. The method includes moving a hoist frame, relative to a base structure, via a hoist when the assembled structure is coupled to the hoist frame. The method also includes positioning, via movement of the hoist, at least one first rotation-enabling coupling of the hoist frame into engagement with at least one second rotation-enabling coupling of the base structure. The method further includes, when the at least one first rotation-enabling coupling and the at least one second rotation-enabling coupling are engaged, rotating the hoist frame about a rolling axis, relative to the base structure, via movement of the hoist, to lower the hoist frame and the assembled structure, coupled to the hoist frame, relative to the base structure. The preceding subject matter of this paragraph characterizes example 17 of the present disclosure.

The method includes adjusting an orientation of the rolling axis by adjusting a position of the at least one second rotation-enabling coupling. The at least one second rotation-enabling coupling is adjustable. The preceding subject matter of this paragraph characterizes example 18 of the present disclosure, wherein example 18 also includes the subject matter according to example 17, above.

The step of adjusting an orientation of the rolling axis includes adjusting the at least one second rotation-enabling couplings in at least one of first directions or second directions, perpendicular to the first directions. The preceding subject matter of this paragraph characterizes example 19 of the present disclosure, wherein example 19 also includes the subject matter according to example 18, above.

One of the at least one first rotation-enabling coupling or the at least one second rotation-enabling coupling includes at least one roller-receiving coupling. The method includes moving the at least one roller-receiving coupling from an open position to a locked position, after the at least one first rotation-enabling coupling and the at least one second rotation-enabling coupling are engaged. The preceding subject matter of this paragraph characterizes example 20 of the present disclosure, wherein example 20 also includes the subject matter according to any of examples 17-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of a hoist tool and associated system and method. The following provides some features of at least some examples of the hoist tool and associated system and method. The hoist tool is utilized for managing a rollover process, during a hoist operation, of an assembled structure about a rolling axis. A hoist operation refers to the process of lifting and maneuvering an assembled structure using a hoist mechanism. Within a hoist operation, the rollover process involved rotating the assembled structure about the rolling axis to achieve a desired orientation of the assembled structure. The rolling axis is adjustable, allowing the hoist tool to be utilized to roll over the assembled structure about a coordinated compound axis, where multiple axes of rotation work together in a synchronized manner, ensuring the assembled structure achieves a desired orientation during the rollover process. The hoist tool comprises two main components: a hoist frame and a base structure. The assembled structure is attached to the hoist frame, while the base structure provides support during and after the rollover process. The hoist frame is movable, relative to the base structure, via a hoist mechanism, allowing the hoist frame to be positioned above the base structure. It features at least one first rotation-enabling coupling, which can engage with a corresponding at least one second rotation-enabling coupling of the base structure. Using the hoist mechanism, the hoist frame is lifted to align and engage the at least one first rotation-enabling coupling with the at least one second rotation-enabling coupling. Once engaged, the hoist frame is rotatable about the rolling axis, relative to the base structure, to enable the rollover of the assembled structure onto the base structure, with gravity facilitating the lowering of the hoist frame and orienting the assembled structure into its intended position. Accordingly, the hoist tool and its associated system and method provide an efficient means of managing the rollover process of assembled structures.

Figure 1:
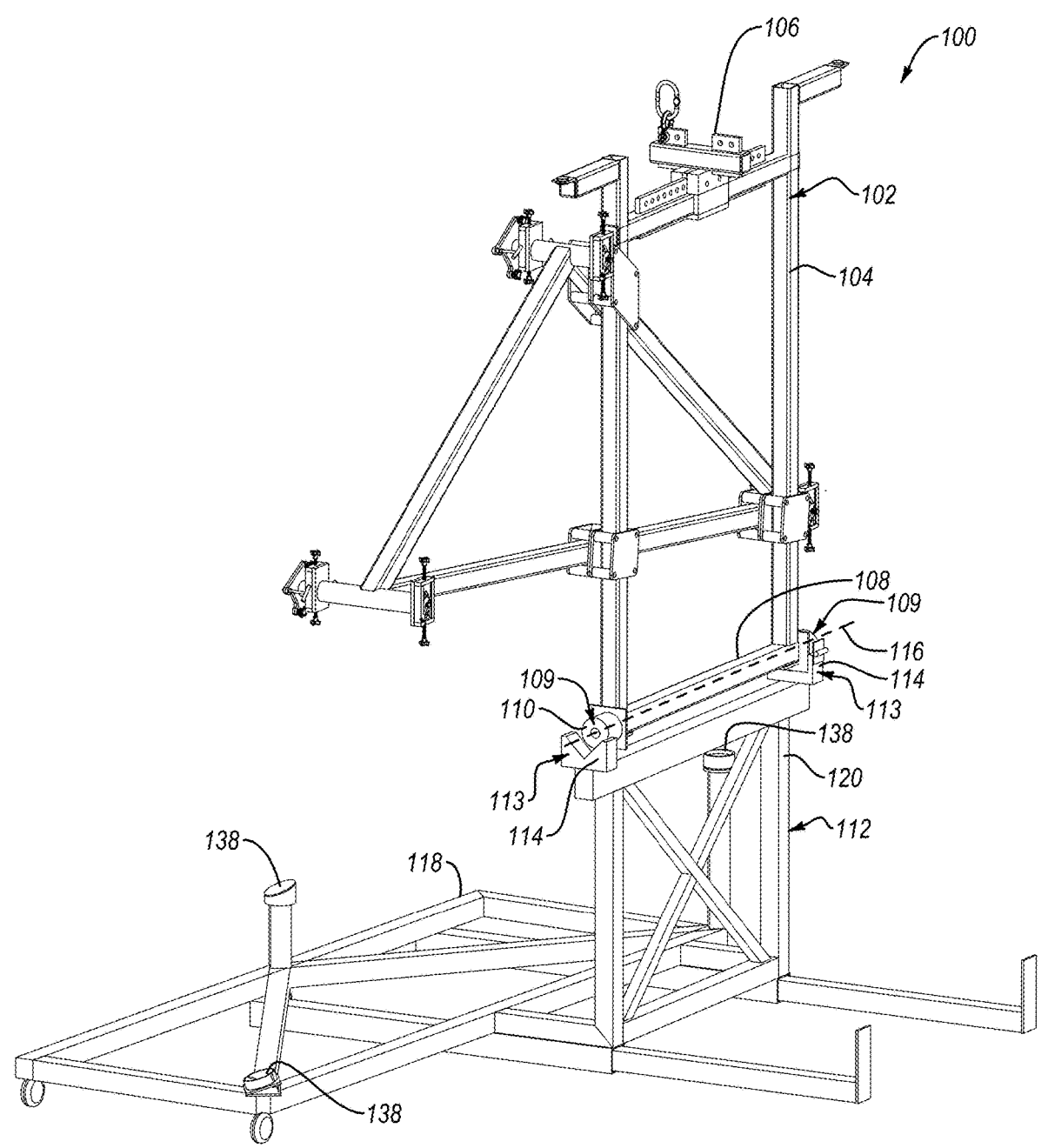
FIG. 1 is a schematic perspective view of a hoist tool, according to one or more examples of the present disclosure.

Referring to FIG. 1, one example of a hoist tool 100 is shown. The hoist tool 100 includes a hoist frame 102 and a base structure 112. The hoist frame 102 is configured to be couplable with the base structure 112 to enable a rollover process of an assembled structure coupled to the hoist frame 102. As used herein, a rollover process refers to the process of rotating an assembled structure from a first position, where the assembled structure is coupled to the hoist frame 102, to a second position, where the assembled structure is supported by the base structure 112. A rollover process allows for the repositioning of an assembled structure to the base structure 112 to facilitate further work or inspection of the assembled structure. Specifically, the hoist frame 102 is positionable relative to the base structure 112 to allow an assembled structure to be rolled over onto the base structure 112. The hoist frame 102 includes at least one first rotation-enabling coupling 109 that is configured to engage with an at least one second rotation-enabling coupling 113 of the base structure 112. Moreover, the at least one second rotation-enabling coupling 113 defines a rolling axis 116 about which the hoist frame 102 is selectively rotatable. Accordingly, when the first rotation-enabling coupling 109 and the second rotation-enabling coupling 113 are engaged, the hoist frame 102 is selectively rotated about the rolling axis 116 to enable a rollover of an assembled structure, coupled to the hoist frame 102, relative to the base structure 112.

Figure 4:
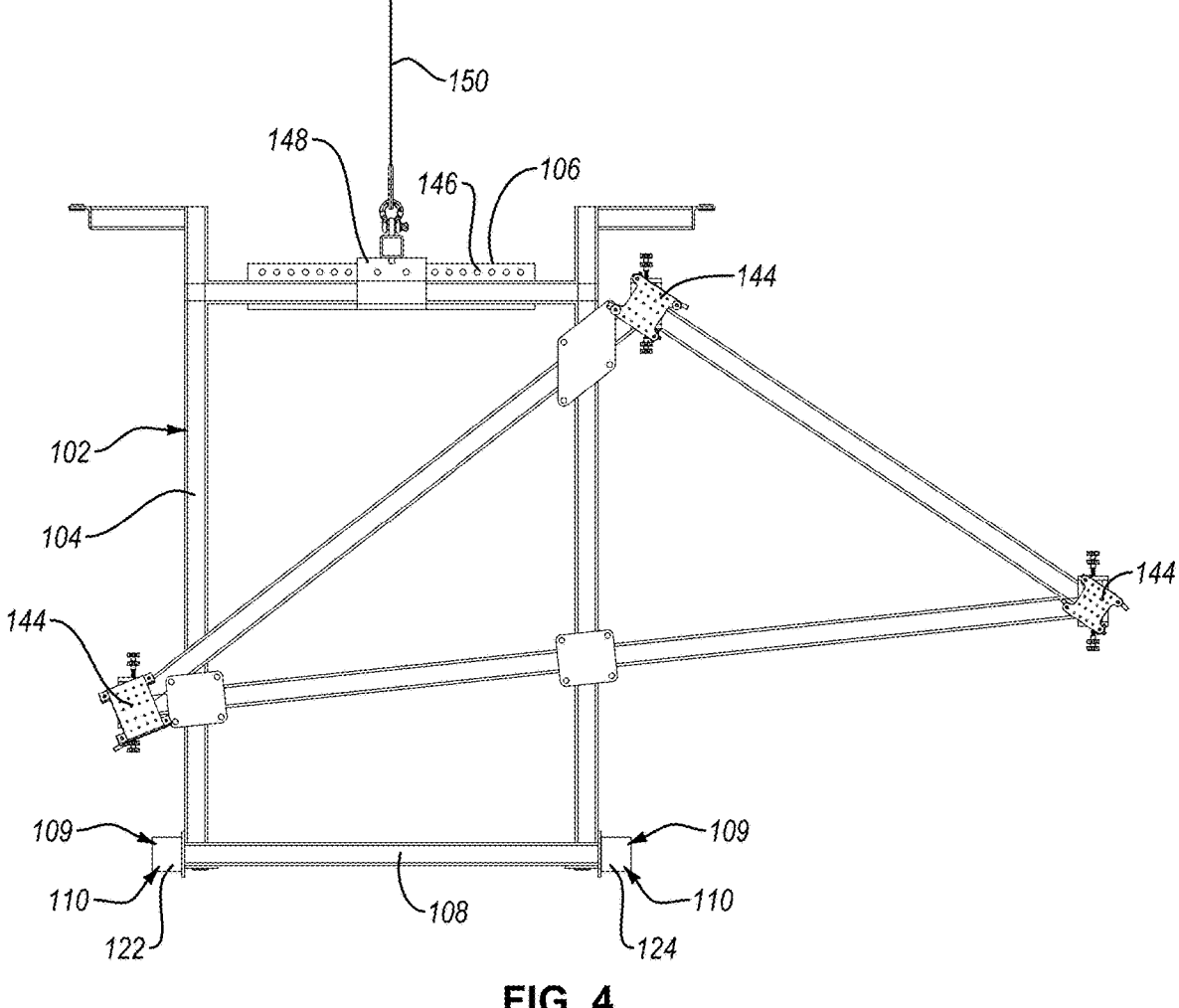
FIG. 4 is a schematic perspective view of a hoist frame of a hoist tool, according to one or more examples of the present disclosure.

As depicted in a front view in FIG. 4, the hoist frame 102 is designed to support and lift an assembled structure during a hoist operation. The hoist frame 102 includes a structural framework 104 having a first end 106 and a second end 108, opposite of the first end 106. The first end 106 is an upper end of the hoist frame 102 and is configured to be connectable to a hoist. The first end 106 includes a hoist-cable coupler 148, which is the connection point, via a hoist cable 150, between the hoist frame 102 and a hoist. The hoist-cable coupler 148 is securely attachable to the hoist, allowing for controlled lifting and lowering of the hoist frame 102 during a hoist operation and rollover process. In some examples, the hoist-cable coupler 148 is fixed in position at the first end 106 of the hoist frame 102. In other examples, the hoist-cable coupler 148 is movable along a hoist rail 146, allowing a position of the hoist-cable coupler 148 to be adjusted to accommodate for changes in a center of gravity of the hoist frame 102. Adjustment of hoist-cable coupler 148 to accommodate for the center of gravity ensures stability and balance of the hoist frame 102 and an attached assembled structure during hoisting operations.

The second end 108 is a lower end of the hoist frame 102 and includes at least one first rotation-enabling coupling 109. The at least one first rotation-enabling coupling 109 is positioned at the second end 108 of the hoist frame 102 such that the at least one first rotation-enabling coupling 109 is engageable with the base structure 112 to allow the hoist frame 102 to be selectively rotatable, relative to the base structure 112. In some examples, the at least one first rotation-enabling coupling 109 is a roller element 110. A roller element 110 may be any component that facilitates the rotation of the hoist frame 102 relative to the base structure 112. Examples of the roller elements include caster wheels, cylindrical rollers, or pivot pins. These components are designed to minimize friction and enable smooth rotational movement, ensuring that the hoist frame can pivot about the rolling axis 116 during the rollover process. For example, the at least one first rotation-enabling coupling 109 is a plurality of roller elements 110 including a first roller element 122 and a second roller element 124 that are spaced apart along the second end 108 of the hoist frame 102. In other examples, the at least one first rotation-enabling coupling 109 is a roller-receiving element. A roller-receiving element 114 is any component designed to accommodate and support a roller element, enabling the roller element to rotate within the receiving structure. Examples of roller-receiving elements include V-shape receptacles, grooves, or tracks. These components are designed to hold the roller elements in place while allowing for rotational movement, ensuing the hoist frame 102 can pivot relative to the base structure 112.

The structural framework 104 defines the overall shape and size of the hoist frame 102. In some examples, the structural framework 104 is configured to correspond with the shape and size of an assembled structure which is attached to the hoist frame 102 during a hoist operation. The structural framework 104 may include multiple, interconnected sections, such as the rectangular and triangular section shown. Some sections of the structural framework 104 may be offset from other sections to accommodate a center of gravity of the hoist frame 102 when connected to an assembled structure. In other examples, the structural framework 104 has a single framework section. Although shown with a specific framework configuration, any configuration of the structural framework 104 having a second end 108 with at least one first rotation-enabling coupling 109 can be utilized. The structural framework 104 also includes a plurality of structure-attachment elements 144 that are configured to attach an assembled structure to the hoist frame 102 during a hoist operation. In some examples, the structural framework 104 may be formed from elongated and interconnected rods, which may have various shapes and sizes. Additionally, the structural framework 104 is a rigid framework and may be made from any of various materials that maintain rigidity during a hoist operation.

Figure 5:
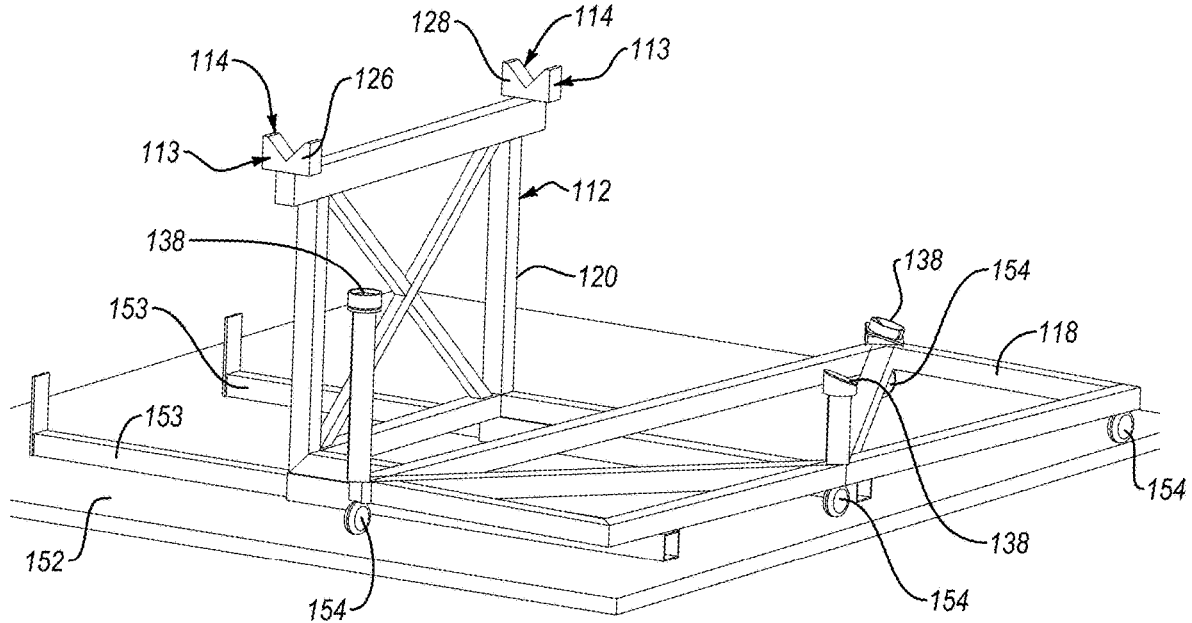
FIG. 5 is a schematic perspective view of a base structure of a hoist tool, according to one or more examples of the present disclosure.

As shown in FIG. 5, the base structure 112 of the hoist tool 100 is shown. The base structure 112 is configured to provide stability and support for an assembled structure throughout a rollover process of an assembled structure. The base structure 112 may be constructed of any of various rigid materials that can withstand the weight and forces exerted during a rollover process. The base structure 112 includes a base-support portion 118 and a rollover-support portion 120. The base-support portion 118 is a foundational structure of the base structure 112 and is configured to interface with a ground surface 152. The base-support portion 118 may include a plurality of wheels 154, attached to a bottom side, that allow the base structure 112 to be movable, relative to a hoist. Although the base structure 112 is configured to be stationary after the hoist frame 102 is engaged, the base structure 112 may be moved prior to engagement with the hoist frame 102 or after completion of the hoist operation, using the plurality of wheels 154, or other mobility component. The base-support portion 118 may also include stabilizing feet 153 to enhance overall stability of the base structure 112 when the base structure 112 is in a stationary position.

In some examples, the base-support portion 118 of the base structure 112 includes at least one structure-support surface 138 configured to contact a portion of an assembled structure when the assembled structure is rolled over. In other words, the at least one structure-support surface 138 is positioned on the base structure 112 to provide support for an assembled structure during and after the rollover process. Specifically, the at least one structure-support surface 138 is configured to halt the rollover of the assembled structure at a desired position, ensuring stability and preventing unintended movement of the assembled structure. Once the assembled structure has been rolled over onto the base structure 112, the at least one structure-support surface 138 bears the weight of the assembled structure. As shown, the base structure 112 includes three structure-support surfaces 138 but any number including more or less than the three structure-support surfaces 138 shown may be included on the base structure 112. The at least one structure-support surface 138 may be positioned about the base-support portion 118 to effectively distribute the load of the assembled structure to the base structure 112.

The rollover-support portion 120 of the base structure 112 extends vertically upwardly from the base-support portion 118. The base-support portion 118 and the rollover-support portion 120 are coupled together to ensure stability and structural integrity to the base structure 112 during a rollover process. The base-support portion 118 and rollover-support portion 120 may be coupled together using various mechanism, including welding, mechanical fastening, or integrally formed as a single unit. The rollover-support portion 120 includes at least one second rotation-enabling coupling 113. The at least one second rotation-enabling coupling 113 is configured to engage with the at least one first rotation-enabling coupling 109 of the hoist frame 102. In some examples, the at least one second rotation-enabling coupling 113 is a roller-receiving element 114. For example, the at least one second rotation-enabling coupling 113 is a plurality of roller-receiving elements 114 including a first roller-receiving element 126 and a second roller-receiving element 128. In other examples, the at least one second rotation-enabling coupling 113 is a roller element.

Figure 2A:
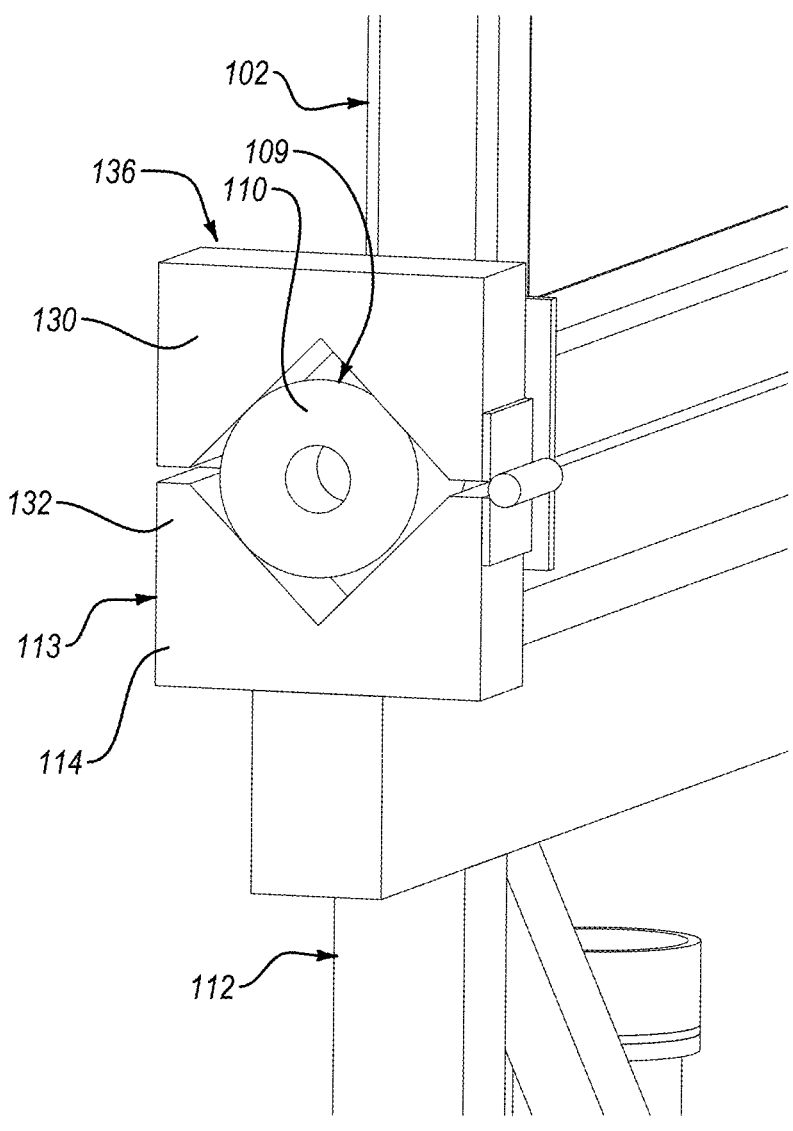
FIG. 2A is a schematic perspective view of a first rotation-enabling coupling and a second rotation-enabling coupling of a hoist tool, in a locking position, according to one or more examples of the present disclosure.
Figure 2B:
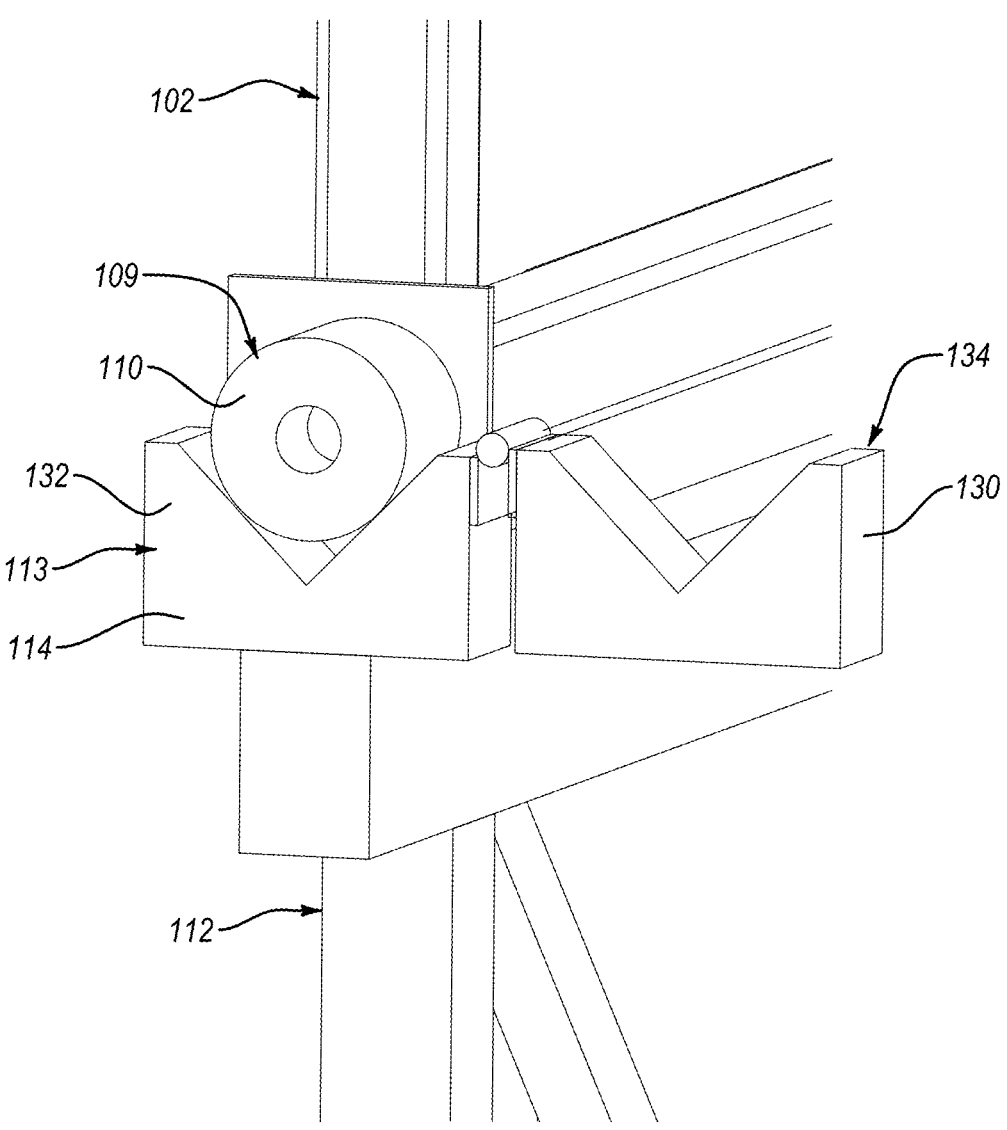
FIG. 2B is a schematic perspective view of the first rotation-enabling coupling and the second rotation-enabling coupling of FIG. 2A, in an open position, according to one or more examples of the present disclosure.

Referring to FIGS. 2A and 2B, the at least one first rotation-enabling coupling 109 of the hoist frame 102 is engaged with the at least one second rotation-enabling coupling 113 of the base structure 112. Specifically, the at least one first rotation-enabling coupling 109 is one of an at least one roller element 110 or an at least one roller-receiving element 114, and the at least one second rotation-enabling coupling 113 is the other one of the at least one roller element 110 or the at least one roller-receiving element 114. As shown, in some examples, the at least one first rotation-enabling coupling 109 is at least one roller element 110 and the at least one second rotation-enabling coupling 113 is at least one roller-receiving element 114. That is, the at least one roller element 110 is a cylindrical or spherical component that is designed to be rotatable about an axis and the at least one roller-receiving element 114 is a component that is designed to accommodate and support the at least one roller element 110 as it rotates about the axis. In other examples, the at least one first rotation-enabling coupling 109 of the hoist frame 102 is at least one roller-receiving element 114 and the at least one second rotation-enabling coupling 113 of the base structure 112 is at least one roller element 110.

In some examples, the at least one roller-receiving element 114 is a V-shaped receptacle. The V-shaped receptacle features two inclined surfaces that converge to form a V-like shape. Moreover, the at least one roller element 110 is cylindrically shaped and sized to engage with a V-shaped receptacle of a corresponding roller-receiving element 114. This configuration allows the roller element 110 to nest securely and rotate within the V-shaped receptacle.

The at least one roller-receiving element 114 may, according to some examples, include an upper segment 130 and a lower segment 132. The lower segment 132 defines the V-shaped receptacle and the upper segment 130 defines a second V-shaped receptacle. The upper segment 130 is pivotable relative to the lower segment 132 to move the at least one roller-receiving element 114 between an open position 134, as shown in FIG. 2B, and a locked position 136, as shown in FIG. 2A. In the locked position 136, the upper segment 130 and the lower segment 132 together define a substantially enclosed receptacle between the V-shaped receptacle and the second V-shaped receptacle. As such, a roller element 110 within the V-shaped receptable is prevented from vertical or lateral movement, while still allowing the roller element 110 to rotate within the roller-receiving element 114. In other words, during a rollover process, the corresponding roller-receiving element 114 in the locked position 136 prevents the roller element 110 from movement other than rotational movement within the corresponding roller-receiving element 114. In the open position 134, the upper segment 130 and the lower segment 132 define a substantially open receptacle between the V-shaped receptacle and the second V-shaped receptacle. Accordingly, while in the open position 134, the roller element 110 can be positioned within the V-shaped receptacle of the corresponding one of the at least one roller-receiving element 114 by moving of the hoist frame 102 using a hoist.

Referring back to FIG. 1, the hoist frame 102 is engaged with the base structure 112. Specifically, the at least one first rotation-enabling coupling 109 of the hoist frame 102 is engaged with the at least one second rotation-enabling coupling 113 of the base structure 112. Once engaged, the hoist tool 100 is movable between and inclusive of a coupling position and a rollover position. As shown in FIG. 1, the hoist tool 100 is in a coupling position, meaning that the hoist frame 102 is extended vertically downward from a hoist and engaged with the base structure 112. In the coupling position, the first end 106 of the hoist frame 102 is vertically aligned above the second end 108 of the hoist frame 102 and an assembled structure is in a first position, relative to the base structure 112. In the first position, the assembled structure is coupled to the hoist frame 102 above the base structure 112 and ready for rotation. This alignment allows the hoist to lift and maneuver the assembled structure, preparing it for the rollover process.

Figure 3:
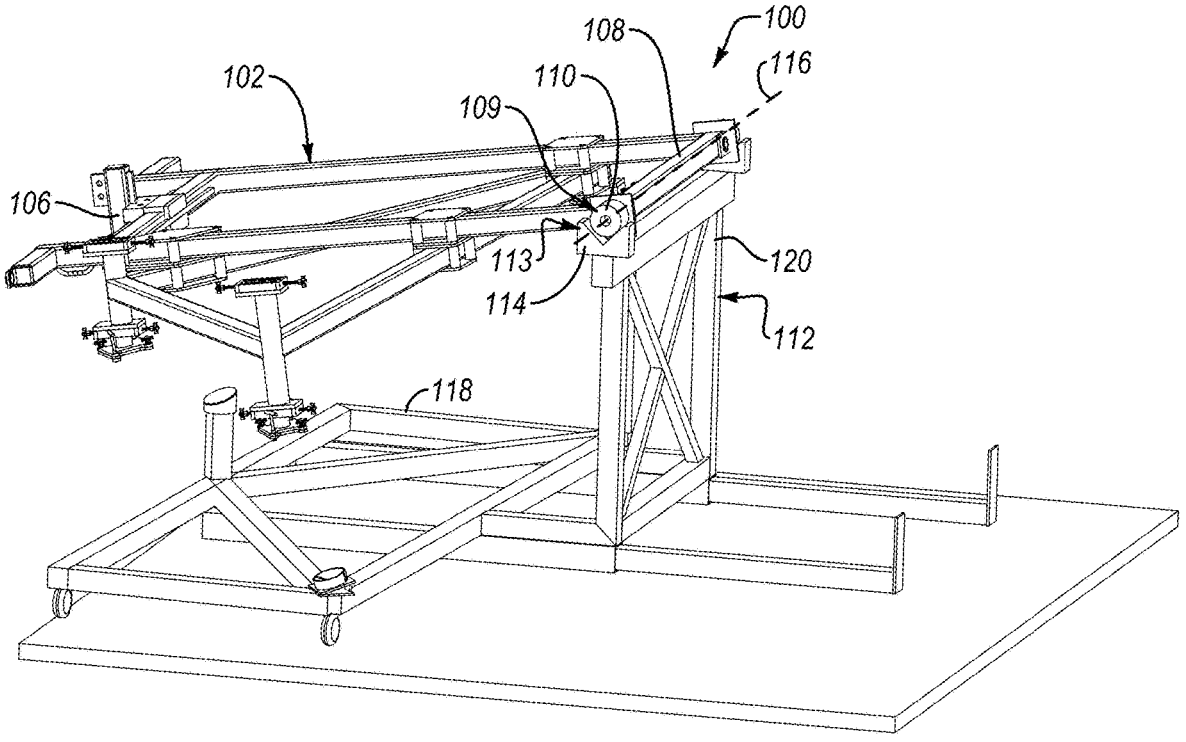
FIG. 3 is a schematic perspective view of a hoist frame and a base structure of a hoist tool, with the hoist frame selectively rotated about a rolling axis, according to one or more examples of the present disclosure.

Referring to FIG. 3, the hoist tool 100 is shown in a rollover position. That is, the hoist frame 102 has been rotated about the rolling axis 116 such that the first end 106 of the hoist frame 102 is lowered towards the base-support portion 118 of the base structure 112. In other words, the first end 106 of the hoist frame 102 is not vertically aligned with the second end 108 of the hoist frame 102 in the rollover position. Accordingly, as the hoist frame 102 rotates from the coupling position to the rollover position, an assembled structure is rolled over into its intended orientation onto the base structure 112. That is, the assembled structure is in a second position, relative to the base structure 112, where the base structure 112 is providing the support for the assembled structure. In the second position, the assembled structure is properly oriented for subsequent tasks such as inspection, maintenance, or additional assembly.

Figure 6A:
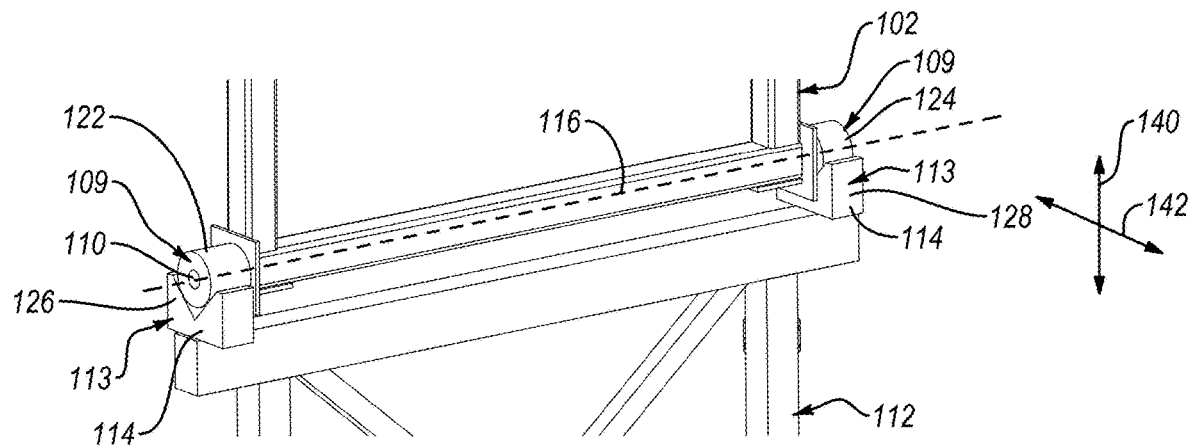
FIG. 6A is a schematic perspective view of two first rotation-enabling couplings and two second rotation-enabling couplings in a first orientation, according to one or more examples of the present disclosure.
Figure 6B:
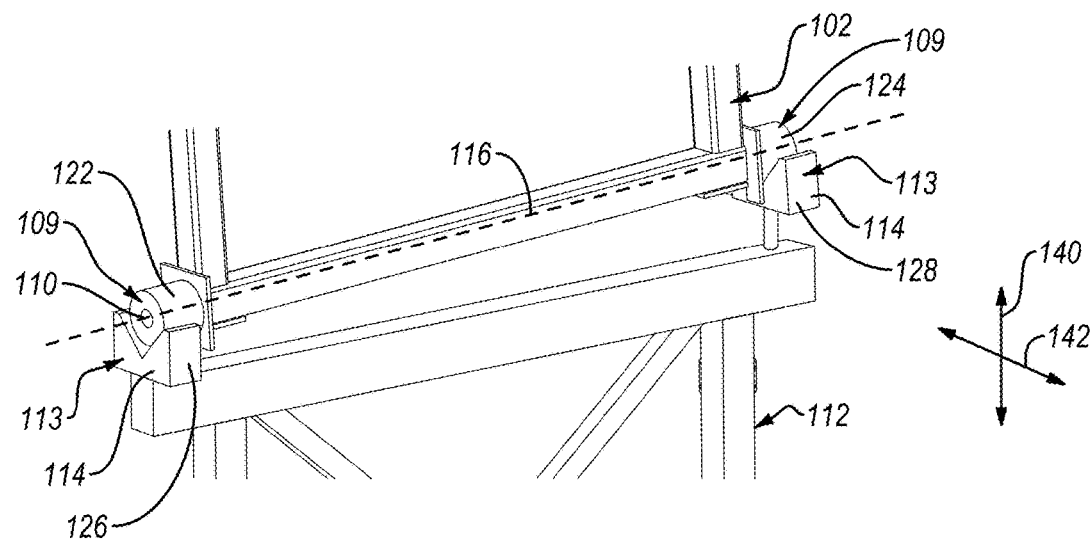
FIG. 6B is a schematic perspective view of the two first rotation-enabling couplings and the two second rotation-enabling couplings of FIG. 6A, in a second orientation, according to one or more examples of the present disclosure.

FIGS. 6A and 6B illustrate the rolling axis 116, about which the hoist frame 102 is selectively rotatable, relative to the base structure 112, facilitating the rollover of an assembled structure. The rolling axis 116 is adjustable, allowing the hoist tool 100 to roll over the assembled structure about a coordinated compound axis. Specifically, the position of the at least one second rotation-enabling coupling 113 can be adjusted relative to the base structure 112. The position of the at least one second rotation-enabling coupling 113 is individually adjustable in at least one of vertically (i.e., up or down) as indicated by first directions 140, or horizontally (i.e., side to side) as indicated by second directions 142. By adjusting the at least one second rotation-enabling coupling 113 both vertically and horizontally, the rolling axis 116 can be reoriented, effectively defining the axis of rotation of the hoist frame 102 mechanically by changing the orientation of the rolling axis 16 on the hoist tool 100 itself. This reorientation may create a coordinated compound axis, allowing the hoist frame 102 to rotate about the resultant axis. In examples where the at least one second rotation-enabling coupling 113 includes a plurality of second rotation-enabling couplings, an orientation of the rolling axis 116 is adjustable by changing the position of at least one second rotation-enabling coupling relative to at least another one of the plurality of second rotation-enabling couplings. Alternatively, in examples where the at least one second rotation-enabling coupling 113 includes a single second rotation-enabling coupling, an orientation of the rolling axis 116 is adjustable by changing the position of one end of the second rotation-enabling coupling relative to the other end of the second rotation-enabling coupling.

Referring to FIG. 6A, the at least one first rotation-enabling coupling 109 comprises two roller elements 110 and the at least one second rotation-enabling coupling 113 comprises two roller-receiving elements 114. Each roller-receiving element 114 corresponds with a roller element 110. Specifically, a first roller-receiving element 126 corresponds with a first roller element 122 and a second roller-receiving element 128 corresponds with a second roller elements 124. The position of at least one of the first roller-receiving element 126 or the second roller-receiving element 128 is adjustable in either first directions 140 or second directions 142 to change the orientation of the rolling axis 116 from the first orientation shown. In the first orientation the rolling axis 116 is shown parallel with a top surface of the rollover-support portion 120 of the base structure 112. Referring to FIG. 6B, a position of the second roller-receiving element 128 has been adjusted vertically, in the first directions 140, to raise the second roller-receiving element 128 vertically from the base structure 112. As a result, the rolling axis 116 has been tilted from the first orientation to a second orientation. In other words, in the second orientation shown, the rolling axis 116 is no longer parallel with the top surface of the rollover-support portion 120 of the base structure 112. In other examples, the position of the second roller-receiving element 128 may be adjusted both vertically and horizontally, altering the orientation of the rolling axis 116 in both vertical and horizontal directions. In other words, the hoist tool 100 may be used to facilitate the rollover of an assembled structure about a coordinated compound axis by adjusted the orientation of the rolling axis 116. The adjustment of the at least one second rotation-enabling coupling 113 may be facilitated by any of various mechanisms. For example, the adjustment mechanism may include a threaded adjustment mechanism, a sliding adjustment mechanism, a pivoting system, or a ratcheting mechanism.

Figure 7A:
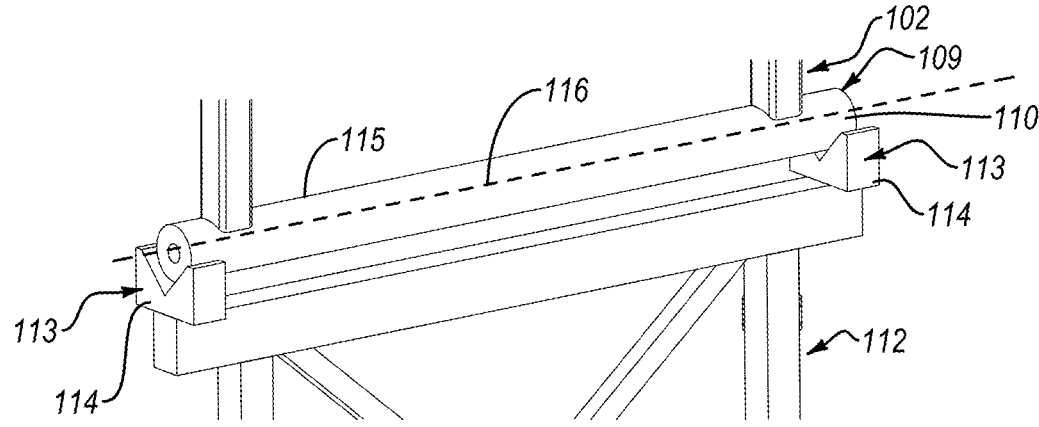
FIG. 7A is a schematic perspective view of one example of at least one first rotation-enabling coupling and at least one second rotation-enabling coupling, according to one or more examples of the present disclosure.
Figure 7B:
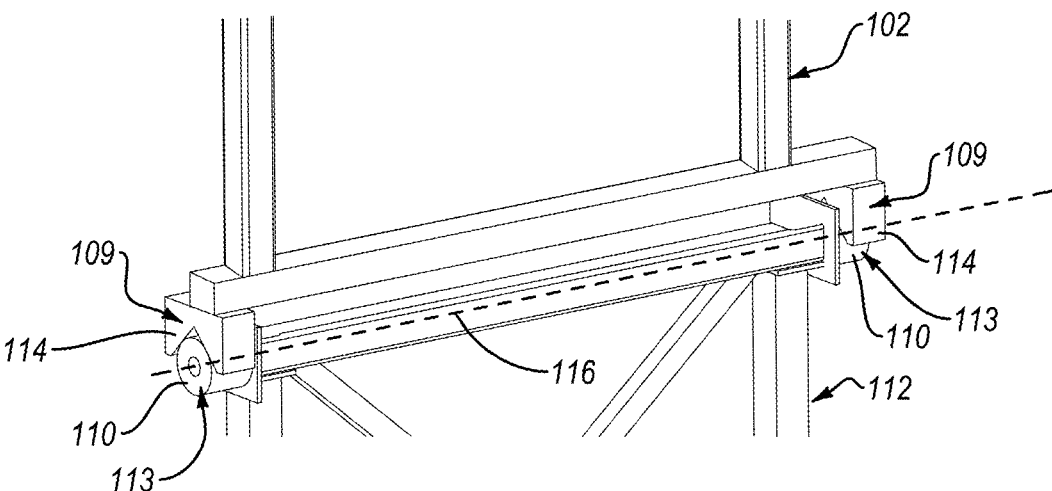
FIG. 7B is a schematic perspective view of another example of at least one first rotation-enabling coupling and at least one second rotation-enabling coupling, according to one or more examples of the present disclosure.

Additional examples of configurations of the at least one first rotation-enabling coupling 109 and the at least one second rotation-enabling coupling 113 are shown in FIGS. 7A and 7B. In FIG. 7A, the at least one first rotation-enabling coupling 109 is a roller element 110 and the at least one second rotation-enabling coupling 113 including a plurality of roller-receiving elements 114. Specifically, the roller element 110 is a single cylindrical rod 115 at the second end 108 of the hoist frame 102. In some examples, the single cylindrical rod 115 is rotatable relative to the structural framework 104 of the hoist frame 102, allowing it to roll during the rollover process. In other examples, the single cylindrical rod 115 is fixed in place, remaining stationary relative to the structural framework 104 of the hoist frame 102, but still able to rotate within the plurality of roller-receiving elements 114 due to its cylindrical shape. Each end of the single cylindrical rod is engageable with a corresponding one of the plurality of roller-receiving elements 114. A position of each one of the plurality of roller-receiving elements 114 of the base structure is individually adjustable, relative to the base structure 112, to adjust the orientation of the rolling axis 116.

Alternatively, as shown in FIG. 7B, in some examples, the at least one first rotation-enabling coupling 109 may be at least one roller-receiving element 114, and the at least one second rotation-enabling coupling 113 may be a corresponding at least one roller element 110. Specifically, the at least one first rotation-enabling coupling 109 includes a plurality of roller-receiving elements 114 and the at least one first rotation-enabling coupling 109 includes a corresponding plurality of roller elements 110. Once engaged with the base structure 112, the hoist frame 102 is rotatable about the rolling axis 116 by rotating the plurality of roller elements 110 to pivot the hoist frame 102 relative to the base structure 112. A position of each one of the plurality of roller elements 110 of the base structure 112 is individually adjustable, relative to the base structure 112, to adjust the orientation of the rolling axis 116. Other configurations for the at least one first and second rotation-enabling coupling are also feasible, including both single and multiple configurations of the first and second rotation-enabling couplings.

Figure 8:
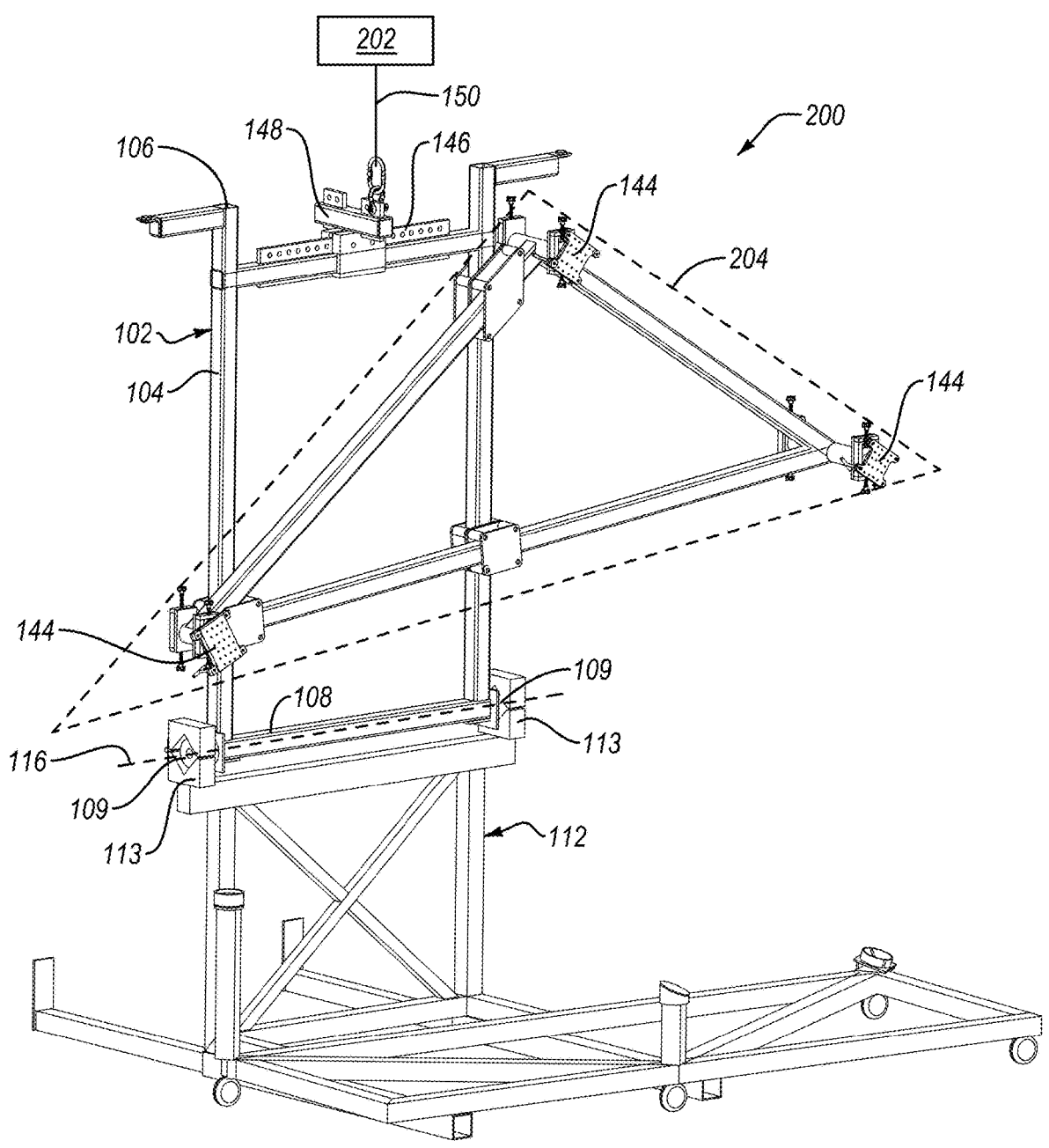
FIG. 8 is a schematic perspective view of a hoist system, according to one or more examples of the present disclosure.

A hoist system 200 is shown in FIG. 8. The hoist system 200 includes a hoist 202, which may be any mechanical device designed for lifting and supporting loads. Connected to the hoist tool 100 via the hoist cable 150, the hoist 202 is utilized to selectively move the hoist frame 102 to position the at least one first rotation-enabling coupling 109 of the hoist frame 102 into engagement with the at least one second rotation-enabling coupling 113 of the base structure 112. The hoist 202 comprises a lifting mechanism, such as a winch or hydraulic lift, configured to exert a lifting force on the hoist frame 102 to enable the engagement of the at least one first rotation-enabling coupling 109 and the at least one second rotation-enabling coupling 113. Accordingly, the hoist 202 is utilized to lift, move, and lower the hoist frame 102, relative to the base structure 112. Additionally, the hoist 202 can provide precise control over the movement of the hoist frame 102, ensuring that the hoist frame 102 is accurately positioned during the rollover process.

The hoist system 200 also includes an assembled structure 204, which is coupled to the hoist frame 102. Prior to being lifted by the hoist 202, the assembled structure 204 is securely coupled to the hoist frame 102. For example, a plurality of structure-attachment elements 144 may be used to couple the assembled structure 204 to the hoist frame 102 at distinct locations on the assembled structure 204. In some examples, the assembled structure 204 may be assembled in an assembly jig and the hoist frame 102 may be used to remove the assembled structure 204 from the assembly jig. The assembled structure 204 may be a structure for any of various industries such as aerospace, automotive, and manufacturing. For example, the assembled structure 204 may be an assembled aircraft structure, such as a wing, fuselage section, empennage component, landing gear assembly, or control surface. In FIG. 8, the assembled structure 204 is represented by a dotted line, serving as a visual reference for any structure that could be coupled to the hoist frame 102.

The hoist 202 is configured to be connected to the first end 106 of the hoist frame 102, such that the hoist 202 is used to selectively raise or lower the first end 106 of the hoist frame 102 to adjust a position of the assembled structure 204, relative to the base structure 112. Accordingly, the hoist 202 may be used to lower the hoist frame 102 until it is engaged with the base structure 112. After engagement of the hoist frame 102 to the base structure 112, the hoist 202 may be further used to lower the hoist frame 102 to facilitate the rollover process of the assembled structure, relative to the base structure 112 from the coupling position to the rollover position. In other words, as the hoist cable 150 is lengthened, the hoist frame 102, facilitated by gravity, is rotated to orient the assembled structure 204 into the intended orientation about the rolling axis 116. That is, the hoist 202 enables the controlled rollover of the assembled structure without robotic actuation.

Figure 9:
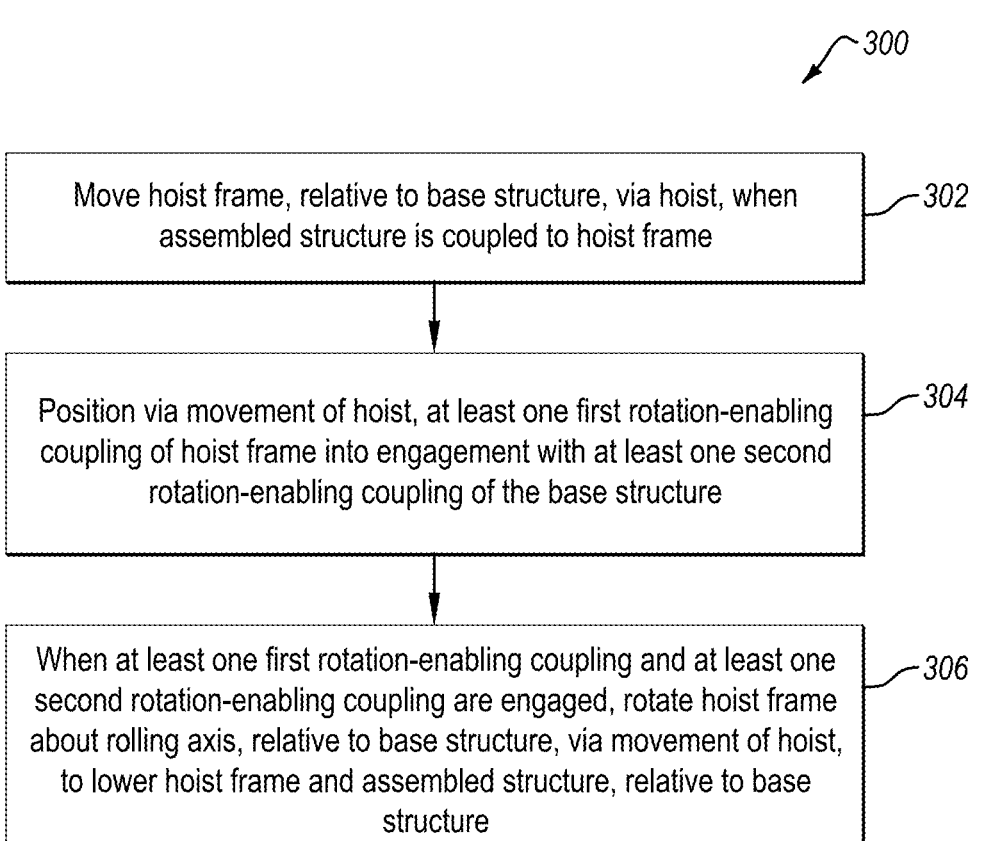
FIG. 9 is a schematic flow view of method of enabling rollover of an assembled structure, according to one or more examples of the present disclosure.

Referring to FIG. 9, according to some examples, a method 300 of enabling rollover of an assembled structure 204 is shown. The method 300 includes the step of (block 302) moving a hoist frame 102, relative to a base structure 112, via a hoist 202, when the assembled structure 204 is coupled to the hoist frame 102. This involves using the hoist 202 to lift the hoist frame 102, along with the coupled assembled structure 204, to a position above the base structure 112. In some examples, the hoist frame 102 is used to remove the assembled structure 204 from an assembly jig, where the assembled structure 204 was assembled.

The method 300 also includes the step of (block 304) positioning, via movement of the hoist 202, at least one first rotation-enabling coupling 109 of the hoist frame 102 into engagement with at least one second rotation-enabling coupling 113 of the base structure 112. Specifically, the hoist 202 is utilized to lower the hoist frame 102 into alignment with the base structure 112, ensuring that the at least one first rotation-enabling coupling 109 on the hoist frame 102 is engaged with a corresponding at least one second rotation-enabling coupling 113 on the base structure 112. Accordingly, the hoist frame 102 and the base structure 112 are in a coupling position, as shown in FIG. 1.

When the at least one first rotation-enabling coupling 109 and the at least one second rotation-enabling coupling 113 are engaged, the method 300 further includes the step of (block 306) rotating the hoist frame 102 about a rolling axis 116, relative to the base structure 112, via movement of the hoist 202, to lower the hoist frame 102 and the assembled structure 204, coupled to the hoist frame 102, relative to the base structure 112. This step involves using the hoist 202 to initiate and control the rotation of the hoist frame 102 about the rolling axis 116. As the hoist frame 102 begins to rotate, gravity assists in lowering the assembled structure 204 towards its intended position on the base structure 112. The engagement of the at least one first rotation-enabling coupling 109 and the at least one second rotation-enabling coupling 113 ensures that the rotation occurs in a controlled manner, maintaining the orientation of the assembled structure 204 throughout the rollover process, ensuring that the assembled structure 204 is securely positioned and oriented on the base structure 112 once the rotation is complete. Once complete, the hoist frame 102 and the base structure 112 are in a rollover position, as shown in FIG. 3, and the weight of the assembled structure 204 is supported by the base structure 112.

In some examples, the method 300 includes adjusting an orientation of the rolling axis 116 by adjusting a position of the at least one second rotation-enabling coupling 113. For example, the at least one second rotation-enabling coupling 113 may include at least two second rotation-enabling couplings which are independently adjustable to reorient the rolling axis 116 from its original position. The position of the at least one second rotation-enabling coupling 113 may be adjusted vertically along first directions 140, and/or horizontally along second directions 142, which are perpendicular to the first directions 140. The adjustment of the at least one second rotation-enabling coupling 113 may be facilitated by various mechanisms. For example, the adjustment mechanism may employ a threaded adjustment mechanism, allowing for precise vertical or horizontal movements. Alternatively, a sliding adjustment mechanism, a pivoting system, or a ratcheting mechanism may be employed.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The term "about" or "substantially" in some embodiments, is defined to mean within +/−5% of a given value, however in additional embodiments any disclosure of "about" may be further narrowed and claimed to mean within +/−4% of a given value, within +/−3% of a given value, within +/−2% of a given value, within +/−1% of a given value, or the exact given value. Further, when at least two values of a variable are disclosed, such disclosure is specifically intended to include the range between the two values regardless of whether they are disclosed with respect to separate embodiments or examples, and specifically intended to include the range of at least the smaller of the two values and/or no more than the larger of the two values. Additionally, when at least three values of a variable are disclosed, such disclosure is specifically intended to include the range between any two of the values regardless of whether they are disclosed with respect to separate embodiments or examples, and specifically intended to include the range of at least the A value and/or no more than the B value, where A may be any of the disclosed values other than the largest disclosed value, and B may be any of the disclosed values other than the smallest disclosed value.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A hoist tool comprising:
a hoist frame comprising:
a structural framework comprising a first end and a second end, opposite of the first end; and
at least one first rotation-enabling coupling at the second end of the structural framework;
wherein:
the hoist frame is configured to be supported by a hoist; and
the hoist frame is configured to be coupled to an assembled structure; and
a base structure, separate from the hoist frame, comprising at least one second rotation-enabling coupling that is selectively and releasably engageable with the at least one first rotation-enabling coupling of the hoist frame,
the at least one second rotation-enabling coupling being configurable between an open configuration enabling engagement and disengagement with the at least one first rotation-enabling coupling and a locked configuration that retains the engagement during movement of the hoist frame relative to the base structure;
wherein:
the at least one second rotation-enabling coupling of the base structure defines a rolling axis;

the hoist frame is selectively movable, via the hoist and relative to the base structure,
to position the at least one first rotation-enabling coupling of the hoist frame into engagement with the at least one second rotation-enabling coupling of the base structure; and
when the at least one first rotation-enabling coupling of the hoist frame is engaged with the at least one second rotation-enabling coupling of the base structure, and when the assembled structure is coupled to the hoist frame,
the hoist frame is selectively rotated about the rolling axis, relative to the base structure,
the base structure remaining fixed during rotation, to enable a rollover of the assembled structure.

2. The hoist tool of claim 1, wherein:
the at least one second rotation-enabling coupling comprises at least two second rotation-enabling couplings;
a position of the at least two second rotation-enabling couplings is adjustable; and
an orientation of the rolling axis is adjustable by changing the position of one second rotation-enabling coupling relative to at least another one of the at least two second rotation-enabling couplings.

3. The hoist tool of claim 2, wherein the position of the at least two second rotation-enabling couplings is adjustable in at least one of first directions or second directions, perpendicular to the first directions.

4. The hoist tool of claim 1, wherein the base structure is selectively movable, relative to the hoist frame, prior to positioning the at least one first rotation-enabling coupling of the hoist frame into engagement with the at least one second rotation-enabling coupling of the base structure.

5. The hoist tool of claim 1, wherein:
the base structure comprises a base-support portion and a rollover-support portion;
the base-support portion is configured to interface with a ground surface; and
the rollover-support portion comprises the at least one second rotation-enabling coupling.

6. The hoist tool of claim 5, wherein the base-support portion of the base structure comprises at least one structure-support surface configured to contact a portion of the assembled structure when the assembled structure is rolled over.

7. The hoist tool of claim 1, wherein:
the at least one first rotation-enabling coupling is one of an at least one roller element or an at least one roller-receiving element; and
the at least one second rotation-enabling coupling is the other one of the at least one roller element or the at least one roller-receiving element.

8. The hoist tool of claim 7, wherein:
the at least one roller-receiving element comprises a V-shaped receptacle; and
the at least one roller element is cylindrically shaped and sized to engage with the V-shaped receptacle of at least one roller-receiving element, such that the at least one roller element is rotatable within the V-shaped receptacle of the at least one roller-receiving element.

9. The hoist tool of claim 8, wherein:
the at least one roller-receiving element comprises an upper segment and a lower segment;
the lower segment defines the V-shaped receptacle;
the upper segment defines a second V-shaped receptacle; and the upper segment is pivotable relative to the lower segment to move the at least one roller-receiving element between an open position and a locked position to define a substantially enclosed receptacle between the V-shaped receptable and the second V-shaped receptable.

10. The hoist tool of claim 1, wherein:

the at least one first rotation-enabling coupling comprises a plurality of roller elements, each one of the plurality of roller elements spaced-apart from others of the plurality of roller elements;

the at least one second rotation-enabling coupling comprises a plurality of roller-receiving elements, wherein a position of each one of the plurality of roller-receiving elements corresponds with a position of a corresponding one of the plurality of roller elements; and the hoist frame is selectively movable by the hoist to position the plurality of roller elements of the hoist frame within a corresponding one of the plurality of roller-receiving elements.

11. The hoist tool of claim 10, wherein:

the plurality of roller elements comprises a first roller element and a second roller element;

the plurality of roller-receiving elements comprises a first roller-receiving element and a second roller-receiving element;

the first roller element is configured to engage with the first roller-receiving element; and the second roller element is configured to engage with the second roller-receiving element.

12. A hoist system comprising:

a hoist;

a hoist frame supported by the hoist and comprising:

a structural framework comprising a first end and a second end, opposite of the first end; and at least one first rotation-enabling coupling at the second end of the structural framework; and a base structure, separate from the hoist frame, comprising at least one second rotation-enabling coupling that is selectively and releasably engageable with the at least one first rotation-enabling coupling of the hoist frame, the at least one second rotation-enabling coupling being configurable between an open configuration enabling engagement and disengagement with the at least one first rotation-enabling coupling and a locked configuration that retains the engagement during movement of the hoist frame relative to the base structure;

wherein:

the at least one second rotation-enabling coupling of the base structure defines a rolling axis;

the hoist frame is selectively movable, via the hoist and relative to the base structure, to position the at least one first rotation-enabling coupling of the hoist frame into and out of engagement with the at least one second rotation-enabling coupling of the base structure; and when the at least one first rotation-enabling coupling of the hoist frame is engaged with the at least one second rotation-enabling coupling of the base structure, the hoist frame is selectively rotated about the rolling axis, relative to the base structure, the base structure remaining fixed during rotation, by utilizing the hoist to lower the hoist frame to enable a rollover of an assembled structure coupled to the hoist frame.

13. The hoist system of claim 12, wherein the hoist is configured to selectively raise or lower the first end of the hoist frame to adjust a position of the assembled structure, relative to the base structure.

14. The hoist system of claim 12, wherein the hoist comprises a lifting mechanism configured to exert a lifting force on the hoist frame to enable the engagement of the at least one first rotation-enabling coupling with the at least one second rotation-enabling coupling.

15. The hoist system of claim 12, wherein:

one of the at least one first rotation-enabling coupling or the at least one second rotation-enabling coupling comprises at least one roller-receiving element;

the at least one roller-receiving element comprises an upper segment and a lower segment; and the upper segment and the lower segment are pivotable, relative to each other to move the at least one roller-receiving element between an open position and a locked position to define a substantially enclosed receptacle between the upper segment and the lower segment.

16. The hoist system of claim 12, wherein the assembled structure is an assembled aircraft structure and the hoist frame is configured to be coupled to the assembled aircraft structure.

17. The hoist system of claim 12, wherein:

the at least one second rotation-enabling coupling comprises at least two second rotation-enabling couplings;

a position of the at least two second rotation-enabling couplings is adjustable; and an orientation of the rolling axis is adjustable by changing the position of one second rotation-enabling coupling relative to at least another one of the at least two second rotation-enabling couplings.

18. The hoist system of claim 12, wherein the base structure is selectively movable, relative to the hoist frame, prior to positioning the at least one first rotation-enabling coupling of the hoist frame into engagement with the at least one second rotation-enabling coupling of the base structure.

19. The hoist system of claim 12, wherein:

the base structure comprises a base-support portion and a rollover-support portion;

the base-support portion is configured to interface with a ground surface; and the rollover-support portion comprises the at least one second rotation-enabling coupling.

20. The hoist system of claim 12, wherein:

the at least one first rotation-enabling coupling comprises a plurality of roller elements, each one of the plurality of roller elements spaced-apart from others of the plurality of roller elements;

the at least one second rotation-enabling coupling comprises a plurality of roller-receiving elements, wherein a position of each one of the plurality of roller-receiving elements corresponds with a position of a corresponding one of the plurality of roller elements; and the hoist frame is selectively movable by the hoist to position the plurality of roller elements of the hoist frame within a corresponding one of the plurality of roller-receiving elements.

* * * * *